W. S. CLARKSON.
VALVE MOTION FOR FLUID PRESSURE ENGINES.
APPLICATION FILED JULY 28, 1915.

1,255,511.

Patented Feb. 5, 1918.
3 SHEETS—SHEET 1.

Inventor:
William S. Clarkson,
by Robert Roberts
Attys.

W. S. CLARKSON.
VALVE MOTION FOR FLUID PRESSURE ENGINES.
APPLICATION FILED JULY 28, 1915.
1,255,511. Patented Feb. 5, 1918.
3 SHEETS—SHEET 2.
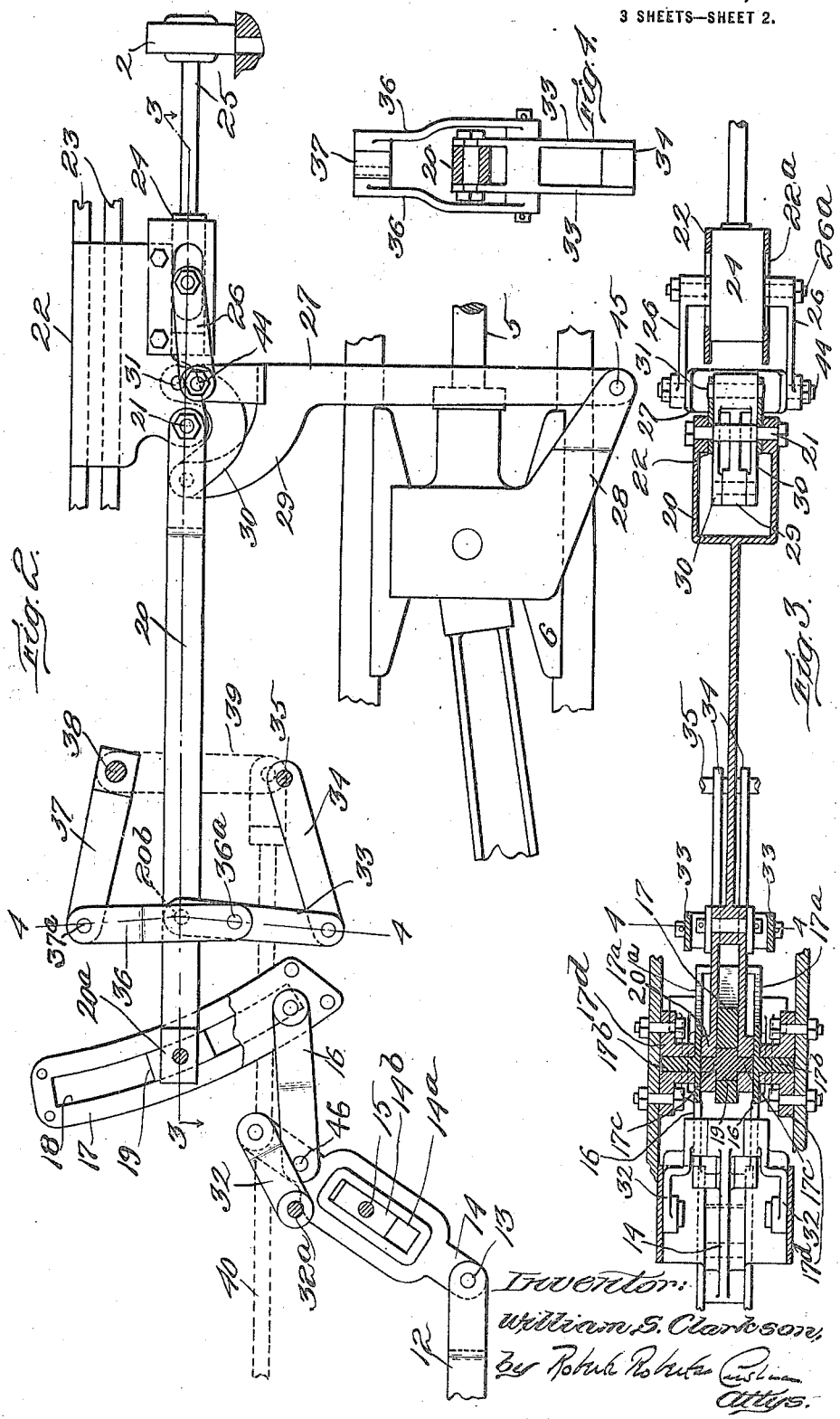

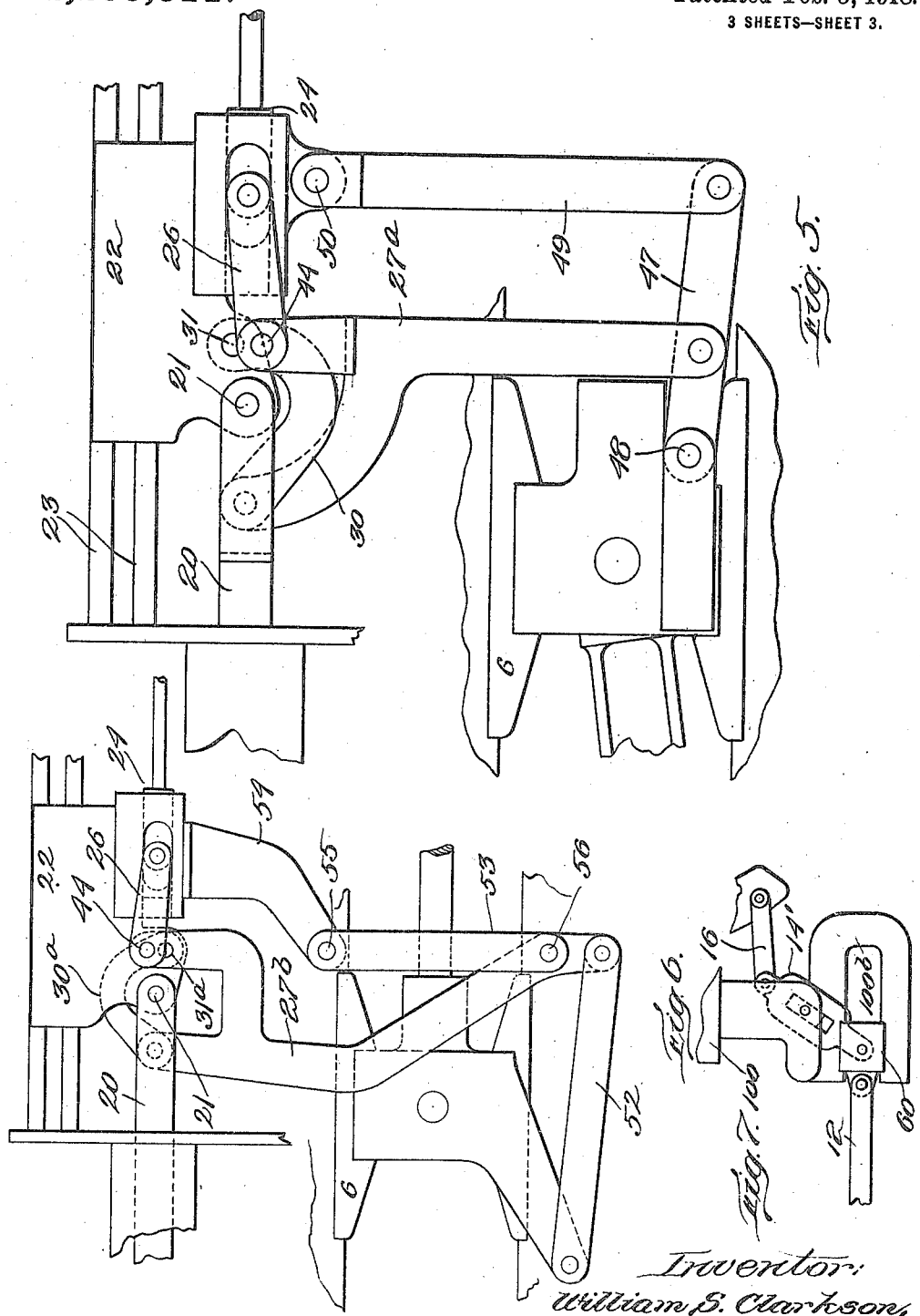

UNITED STATES PATENT OFFICE.

WILLIAM S. CLARKSON, OF NEW HAVEN, CONNECTICUT.

VALVE-MOTION FOR FLUID-PRESSURE ENGINES.

1,255,511. Specification of Letters Patent. Patented Feb. 5, 1918.

Application filed July 28, 1915. Serial No. 42,416.

*To all whom it may concern:*

Be it known that I, WILLIAM S. CLARKSON, a citizen of the United States, and resident of New Haven, in the county of New Haven and State of Connecticut, have invented new and useful Improvements in Valve-Motions for Fluid-Pressure Engines, of which the following is a specification.

My invention relates to variable cut-off and reversing valve gearing for reciprocating fluid-pressure engines, and I shall herein refer, for purposes of illustration and description, to certain only of many uses of my said invention, such as its employment in improvement of or substitution for the well known Walschaert or outside link-motion mechanism for steam locomotives.

One object of my invention is to so control the valve movements as to allot a greatly increased portion of the cycle of movement to each open position of the valve and to cause a correspondingly smaller portion of the cycle of movements to be occupied by the opening and closing movement, with a corresponding gain in the time allowed for expansion and lessening of the compression time in the exhaust end of the cylinder.

Another object of my invention is to obtain by simple and durable means a resolution of the motions of an eccentric or crank, which may have a constant angle of advance with respect to the main crank of the driving axle, into a movement at the valve to be operated, characterized by uniform and regular covering and uncovering of the fluid admission ports, at times and at rates more nearly corresponding to the theoretical necessities of an elastic fluid reciprocating engine than have been heretofore obtained by any means known to me. Other objects of my invention are to obtain by the use of a single slide valve a longer cut-off with a full stroke of the valve, and a greater port opening at shorter cut-off than in existent practice. Other objects are readily and practically to obtain a longer expansion period after cut-off with reduced compression on the exhaust stroke and reduced pre-admission.

For the above and other purposes my invention also comprises an improved mechanical movement adapted to convert a rotary motion as at a valve actuating crank or eccentric, into a reciprocating motion as at a valve, which is adjustable for length of stroke, which is characterized by local increases of speed at the ends of the stroke of the reciprocated part, and which enables a light and symmetrical design of the parts free from irregular and unbalanced wearing stresses.

In the accompanying drawings,

Fig. 2 is a side elevation on a larger scale, with parts broken away, of a portion of the valve gear shown in Fig. 1;

Fig. 3 is a section on line 3—3 of Fig. 2;

Fig. 4 is a section on line 4—4 of Figs. 2 and 3; and

Figs. 5, 6 and 7 show modifications hereinafter referred to.

Figure 1:
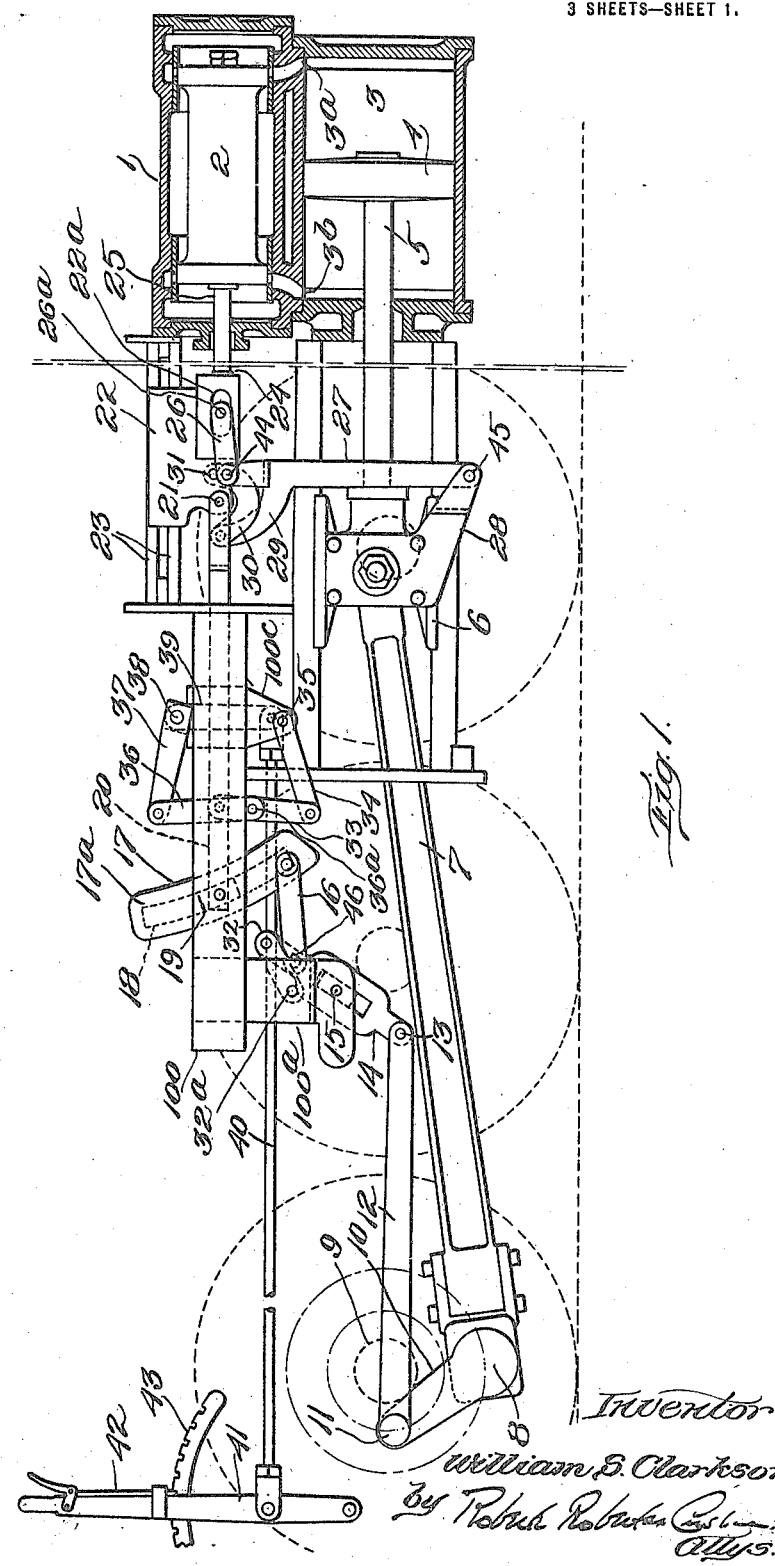
Figure 1 is a side elevation partly in vertical section of a portion of a steam locomotive equipped with my improved valve gear.

Referring now to Fig. 1, for purposes of the present description, the steam chest 1, the slide valve 2, which as shown is of the inside admission type, the cylinder 3, the piston 4, the piston-rod 5, the cross-head 6, the connecting rod 7, the crank 8, and the driving axle 9 may all be of any desired or usual construction. The driving axle 9 carries an eccentric 11 preferably on the overhung rigid arm 10. The operating connections for the valve 2 comprise the eccentric rod 12 connected to the eccentric 11.

The said connections between the valve 2 and the means for driving it comprise means to reciprocate and to determine the lap and lead of the valve movements. Such means comprise mechanism [hereinafter mentioned as the link motion] variable to alter the length of the valve stroke, to predetermine with respect to the moving piston the idle time elapsing between valve closing or cut-off and the valve opening or exhaust, broadly as usual in the art, but provided with novel means for accelerating the passage of the valve past fixed points at the extremes of its stroke, and for delaying the relative movement of the valve at the period between strokes.

Said means also comprise devices [hereinafter mentioned as the combination devices] for giving the valve independently of the link motion an increment of rapid advance in the same direction as the stroke from the link motion and at or near the same time as the accelerated movement due to the new link motion, whereby the accelerated movement of the valve due to the link motion has superposed upon it to further accelerate it the increment due to said combination devices.

*The link motion.*—The usual link 17 having a curved slot 18 is pivoted on the motion-frame 100 at any convenient position, as between the cylinder and valve-chest and the driving axle.

A preferred construction, best shown in Figs. 1 and 3, comprises a link central between trunnion plates 17$^a$ spaced away from the link, and having bearing trunnions 17$^b$ at the middle of their outer faces, the three members 17$^a$, 17, and 17$^a$ being fastened together at their ends, to provide between the inner faces of plates 17$^a$ and link 17 spaces for the bearing blocks 20$^a$ attached to the forked ends of a radius rod 20, bearing bores in said blocks 20$^a$ taking over trunnions 17$^c$ projecting from a link block 19 sliding in slot 18. The slot 18 preferably is central upon an arc of the radius measured by the length between centers of the bearing bores at each end of radius rod 20. Trunnions 17$^b$ find their bearing in glands 17$^d$ bolted, for adjustment if desired, to the motion-frame. The central vertical plane of link 17 and radius-rod 20 is a plane of symmetry for the described structures, preferably coincident with the vertical plane of the valve stem 25 and eccentric rod 12.

Motion is imparted to link 17 through like connections 16 pivoted to each plate 17$^a$ at one of their ends, their other ends being pivoted at 46 to opposite sides of a variable transmission lever 14, which is slotted at 14$^a$ to slide upon and rock with a block 14$^b$ pivoted at 15 to a depending member 100$^a$ of the motion-frame. Lever 14 is pivoted at 13 to eccentric rod 12.

The position of lever 14 with respect to its fulcrum 15 is varied by symmetrically bent links 32 pivoted to the upper end of lever 14 and pivoted at 32$^a$ to the frame member 100$^a$. The distances between the centers of the linkage 14, 16, 32 are preferably selected to determine a path for the center 46 with respect to the fixed parts which shall first rise with little longitudinal movement, then move longitudinally with little rise, and then fall with little longitudinal movement. This condition is satisfied when the relative dimensions are substantially as shown, the point 13 of lever 14 traveling in substantially a horizontal straight line, the virtual arm 13, 15 of said lever decreasing and the arm 46, 15 increasing as said lever approaches the vertical. Travel of the point 46 effective to rock link 17 is therefore faster throughout the middle of its forward and back stroke than at its ends.

In some cases I may employ with the same effect the modified construction shown in Fig. 7, in which the links 32 are replaced by a crosshead block 60 bearing the pivot 13 of lever 14, held to slide in a guideway 100$^b$ of the motion-frame, to determine a right line movement for the lower end of lever 14, and an increase as described in the rate of movement in the middle of the stroke of its upper end. Other modified means for varying the virtual arms of lever 14 during its stroke such as will be obvious to those skilled in the art when informed by this disclosure are also within my invention.

By the described connections, the dwells at the ends of the reciprocation of the point 13 due to passage by eccentric 11 of its forward and back dead centers coincide with the intervals of reduced effective speed of the connector 16, while the rapid movements of point 13 due to rotation of eccentric 11 coincide with the increases of speed of connector 16 given by the variable lever 14. Link 17 therefore moves rapidly from one extreme of its swing to the other, and is quiescent at the end of its stroke during a relatively great part of a cycle measured by one complete or double oscillation.

The direction and extent of movement of the valve-stem are as usual controlled from the reverse and cut-off lever 41 having the usual locking means at 42, 43, through a reach-rod 40. I have successfully avoided error of translation of the motion imparted by link 17 and radius rod 20 by an improved suspension for the radius rod best shown in Figs. 1, 2 and 4, designed to prevent any vertical resultant of the longitudinal movement of the radius bar due to its suspension becoming effective to change the position of link block 19 in the wrong direction during the movement of the valve. Rocking in a frame member 100$^c$ a lifter lever 37 rigid with shaft 38 and depending arm 39 connected to reach rod 40 carries pivoted thereto at 37$^a$ separated like suspension links 36 pivoted at 36$^a$ between the ends of a forked supporting link 33 pivoted at its upper end at 20$^b$ to radius-rod 20, and at its lower end to a radius link 34 pivoted at 35 to the member 100$^c$. During operation the link 37 and pivot point 37$^a$ are fixed, so that backward and forward movement of radius-rod 20 causes links 36 to rock on pivot 37$^a$, the pivot 36$^a$ rising at the ends and falling toward the middle of each stroke in the circular arc described by it. The forked supporting link 33 has at its lower end substantially vertical motion only, by reason of its connection to radius link 34, so that the arm 36$^a$, 20$^b$ of link 33 has a corresponding oscillation about 36$^a$ as a center, the point 20$^b$ falling in respect to center 36$^a$ when the radius-rod 20 is displaced to right or left of the center of its stroke. The rise of point 36$^a$ due to the displacement of links 36 is thus compensated for by the falling of the position of point 20$^b$ in respect to point 36$^a$, and vice versa, the linkage 34, 33, 36, 37 being effective to maintain the block 19 fixed in respect to link 17 without error of noticeable dimensions throughout the range of lift of block 19.

The described structure avoids the error and inconvenience of the long suspension of the prior art. The laterally symmetrical form of the linkage with respect to the radius-rod minimizes wear.

The radius-rod 20 is directly connected, preferably by means of the forked end and bearing pin 21 best shown in Fig. 3, to a combination cross-head 22 sliding on guides 23. The motions of cross-head 22 are variable by means of link 17, block 19, lifter lever 37, and the described rocking means from no movement [position of Figs. 1 and 2,] to the full swing of the link 17, which is characterized as described above by rapid passage at the middle of the arc of swing and a long dwell at the ends before the opposite rapid movement begins.

*The combination devices.*—Cross-head 22 preferably comprises side plates depending from the guide 23, and receiving between them head 24 of valve stem 25, which is given with respect to cross-head 22 an increment of movement in the direction of the valve movement due to the link-motion, at the beginning and end of each stroke of the piston 4.

The extent or value of the increment of movement so given is independent (except for a negligible fraction of its amount) of the extent of the stroke of the valve as determined by the position of the link block 19. The giving of such an increment has for a part of its function the movement of the valve with respect to its connections through a distance compensating for the thickness of the slide members constituting the port-covering means, thereby to cause the movements given the valve by the other means for moving the valve to have such effect as would follow employing slide members of an imponderable thickness, the incremental motion of the slide member causing it to be always ahead of the same plane with respect to the direction of the valve stroke. So far as I am aware, compensation movements for the purpose of correcting for the thickness of the slide members of the valves given by the devices of the prior art have always been given in the opposite direction, in respect to the regular or port-opening movement of the valve from that caused by my present devices, and have been distributed in effect throughout the stroke of the valve, or localized at the middle, instead of being concentrated at the ends of the stroke of the valve.

Important advantages flow from adding the compensating increment to the motion of the valve at the time of covering and uncovering the ports at the ends of its stroke. The devices already described having increased the rapidity of movement at this time, and increased the dwell between the valve strokes, the additional increment now given further decreases the time of passage of the moving edges of the slide-members over the open ports, both on the admission and on the exhaust side of the valve-member. The time so gained by increase of speed at the active parts of the stroke is added to the time of idle or no movement of the valve due to the link-motion occurring at and near the ends of each valve-stroke.

The increment giving devices now to be described may also be capable of moving the valves 2 with respect to ports 3$^a$ and 3$^b$ to give a minimum admission time and an opening of the exhaust when the block 19 is at the neutral position for one direction of motion of driving axle 9, the central position of lever 41 illustrated thus representing a forward drive at minimum cut-off.

Pivoted at 45 on an attachment 28 of the cross-head 6 the combination-lever 27 is forked at its upper ends, each of which is pivoted as at 44 to a link 26 having a boss entering slots 22$^a$ in the cross-head 22 and pivoted at 26$^a$ to the head 24. An integral arm 29 of the lever 27 is received between and pivoted to bent links 30 which are in turn pivoted at 31 to the cross-head 22. The preferred construction shown in Fig. 3 and above described enables the variable lever 27, 26, 31 etc., and all of the connected parts to be symmetrically arranged on each side of the vertical central plane of the valve-stem 25, for the same purposes as the similar arrangement of the other transmission elements described above.

The structure 27, 29, 30, 31 constitutes a variable lever having a virtual arm 45—44 of invariable length and a virtual arm 44—31 increasing as the point 45 swings on either side of the vertical. During reciprocation of the cross-head 6 and piston 4 with respect to cross-head 22, assumed to be stationary, beginning at the position shown in Fig. 1 and moving to the left, center 44 will move downward in response to the swing of lever 27 to the left and the virtual arm 44—31 will increase, the center 44 moving to the left at an increasing rate as cross-head 6 approaches the end of its stroke to the left, head 24 thereby moving with respect to cross-head 22 at a rate increasing toward the end of the stroke.

On the return stroke arm 44—31 decreases rapidly as lever 27 approaches the position of Fig. 1, head 24 moving to the right with decreasing rapidity.

On the remainder of the stroke to the right of cross-head 6, center 44 again is lowered, again increasing virtual arm 44—31 and increasing the speed to the right by the increment of motion given head 24 with respect to cross-head 22. The half stroke to the left following, returning to the position of Fig. 1, again reverses the motion and increases speed of the head 24 in the same manner.

The proper motions of cross-head 22 do not interfere with the effect of the combination-lever 27, displacement of the cross-head 22 in either direction with respect to the position of Fig. 1 resulting merely in delaying the time of the addition of the increment due to the combination-lever to correspond with the extent of the stroke of the valve increased by increasing the stroke of the cross-head 22. The time of rapid movement of the link 17 having been localized at a narrow part of the cycle measured by one revolution of eccentric 11, it will be found that with a proper angle of advance of said eccentric, the motions of the cross-head 22 for the greater part of its stroke occur during the dwell occasioned by the relative position of lever 27 at the position of Fig. 1, the rapid movements due to lever 27 occurring during the ends of the stroke of cross-head 22. For a maximum cut-off the increment given by the combination devices 27, etc. may come within the dwell occasioned by the link motion, but in that case the increased speed of the valve due to the increased angle swept by the block 19 at the same time maintains the desired rapidity of movement of the valve with respect to the ports.

When for any reason it is inconvenient to employ a combination-lever 27 of a length comparable with that described, I may employ the construction shown in Fig. 5 in which the combination-lever 27ª is pivotally connected at its lower end to a lever 47 fulcrumed at 48 to cross-head 6, said lever being pivoted at its outer end to a suspension link 49 pivoted at 50 on an attachment of cross-head 22. With the construction shown, movement out of the vertical of lever 27ª which would otherwise unduly increase the virtual arm 44—31 of the combination-lever system is compensated for by the motion of the lever 37 due to the upward increment of swing of the suspension link 49.

The constructions above described have been those applicable to a slide valve of the inside admission type. In order to obtain the benefits of my invention in connection with a slide valve of the outside admission type, the link-motion described may be employed without change, but the angle of advance of the eccentric 11 will be shifted through 180°, to secure as usual an opposite arrangement of the phases of the valve movement with respect to movements of the piston 4. But in order to obtain the benefit of the combination-lever device to the same effect as before it is necessary also to reverse the phase of the increment given by the combination-lever. One solution within the scope of my invention is illustrated in Fig. 6. A lever 27ᵇ of the first order is pivoted at 56 to a suspension link 53 pivoted at 55 on an attachment 54 of cross-head 22. A link 52 connects cross-head 6 to lever 27ᵇ, which is fulcrumed by means of the bent links 30ª at 31ª to the cross-head 22, and pivoted at 44 to the connecting links 26 attached as before to the head 24. Movement out of the vertical of the lever 27ᵇ causes the virtual arm 44—31ª to decrease, and the dwell due to the motions of lever 27ᵇ is produced at the end of the stroke of cross-head 6. The increase and decrease of the virtual arm is a function of the suspension-link 53, which causes lever 27ᵇ to rise bodily as the suspension-link swings out of the vertical in either direction.

It will be understood by those skilled in the art, without further description, that the placing of the increased speeds with respect to the valve motions will by the described modified forms be made to conform to the desired movements of a valve of the outside admission type in the same manner and with the same benefits as the described variations in the movement of the inside admission valve described more at length.

What I claim is:

1. A valve-motion having a part to be reciprocated comprising a rotary eccentric, a reciprocating eccentric-rod, and a connection to said part, and transmission means between said eccentric-rod and connection adapted to cause a like delay in the movement of said connection during the reversal at the ends of the stroke in each direction of said eccentric-rod.

2. A valve motion having therein a transmission lever having arms relatively variable during oscillation about its fulcrum, interposed between a rotary driving and a reciprocating driven member thereof, whereby to increase the velocity of the reciprocated member throughout a portion of its stroke in each direction, and to decrease the velocity of said member at the remaining portions of its movement.

3. In a link-motion having a rocking link, an eccentric and reciprocating connections between said eccentric and link for rocking said link comprising a transmission lever having arms variable in effective length during the stroke of reciprocation in each direction of said connections.

4. A link motion having in combination a rocking link, an eccentric and eccentric-rod for rocking said link, and a variable transmission lever between said reciprocating rod and said link adapted to move the link at an increased rate throughout the middle of its motion in each direction.

5. A link motion having a transmission lever and means for shifting the relative position of said lever and its fulcrum in response to the angular position of said lever interposed between a rotary driving and a rocking driven member thereof.

6. A valve motion comprising a transmission lever having arms oppositely variable in length in accordance with the angular position of said lever interposed between a rotary and a reciprocating member thereof.

7. A link motion comprising an eccentric-rod, a rocking link, and a variable transmission lever interposed between said eccentric-rod and said link, the said parts each being disposed on both sides of and symmetrically with respect to a common central longitudinal plane.

8. A valve motion having a part to be reciprocated comprising a rotary eccentric, a link rocked thereby, a link-block sliding in said link, and a radius-rod connecting said block and said part to be reciprocated suspended on a linkage by a first member supported by a second member adapted to move said first member vertically when said first member is moved horizontally.

9. A variable cut-off device having as elements a rocking link and sliding block therein, a radius-rod pivoted to said block, and means for adjusting the position of said radius-rod to determine the position of the block in the link comprising a lifter lever, and a linkage comprising pivoted elements having opposite arcs of motion compensating against vertical motions of said bar connecting said bar to said lever.

10. A variable cut-off device having as elements a rocking link and sliding block therein, a radius-rod connected to said block, and a suspension linkage for said radius-rod, the said elements each being disposed on both sides of and symmetrically with respect to a central longitudinal plane.

11. A device of class described having a radius-rod and a vertically adjustable suspension therefor comprising a lifter lever and manually operated connections therefor, a radius link pivoted to a fixed part, a supporting link pivoted at one end to said radius-rod and at the other end to said radius link, and a suspension link pivoted at one of its ends to said supporting link and at its other end to said lifter lever.

12. A device of the class described having a radius-bar and a vertically adjustable suspension therefor comprising a lifter lever and a radius link each movable about a relatively fixed center at one end thereof, a supporting link having members whose ends take over and are pivoted to the other ends of said radius link and said radius-bar respectively, and like links each pivoted at one end on one side of said lifter lever and at the other end on one side of said supporting link.

13. A valve-motion for fluid pressure engines and the like having a valve, a rotary eccentric, and connections between said eccentric and valve for reciprocating said valve comprising means for changing the effective length of the connections at variable rates during each stroke of the reciprocation for moving said valve with respect to one part of said connections.

14. A valve-motion for fluid pressure engines and the like having a reciprocating valve, a link motion and a connection between said link motion and valve comprising a variable lever adapted to variably alter the length of said connection with respect to said valve and link motion during each stroke.

15. Mechanism of the class described having a rotary driving member, a reciprocatory driven member, such as a valve, an eccentric and connecting devices for reciprocating said driven member, and devices cooperating with said connecting devices for giving said driven member with respect to the parts upon which it reciprocates an increment of advance in the direction of reciprocation, the addition of said increment being substantially localized at the ends of each stroke thereof.

16. A valve-motion for fluid pressure engines and the like having a reciprocating piston and a reciprocating valve, a rotary eccentric, and a connection between said eccentric and valve comprising a lever movable in response to piston motion and having an arm variable during each stroke of said piston to change the relative position of said valve.

17. A valve-motion for fluid pressure engines and the like having a reciprocating piston and a reciprocating valve, a rotary eccentric, and a connection between said eccentric and valve comprising a lever having an arm moving with said piston, and means for varying the effective length of another arm of said lever during each stroke of said piston, whereby to vary the position of said valve with respect to said connections.

18. In a valve motion, a reciprocating piston and a reciprocating valve, an eccentric and connections for operating said valve, in combination with a lever interposed between said valve and said connections, one arm of said lever being connected to a part moving with said piston, and means for varying the effective length of another arm of said lever, to alter the relative position of said valve with respect to said connection from a maximum to a minimum and again to a maximum during each stroke of the piston.

19. A valve motion comprising in combination a valve, a link motion for moving said valve, and means for giving said valve an increment of rapid advance in the same direction as the motion caused by said link motion at or near the ends of the movement resulting from said link motion.

20. A valve motion comprising in combination a valve, a link motion giving an increased harmonic reciprocation for rapidly moving said valve through a large part of its stroke, and means for giving an additional increment of rapid advance in the same direction as the motion caused by said link motion at or near the ends of the movement resulting from said link motion.

21. Mechanism of the class described having a reciprocating driving member such as a piston, a rotary member and eccentric driven thereby, a reciprocatory driven member such as a valve, and connecting devices for reciprocating said driven member from said eccentric comprising a variable lever having a virtual arm altered in length in response to its angular position for giving said driven member with respect to said connections an increment of advance, and means connecting said reciprocating driving member and said lever to vary its angular positions.

22. An elastic fluid pressure engine having a cylinder and piston, an axle and eccentric rotated by said piston, a valve-stem for controlling admission and exhaust at said cylinder, and reciprocating connections from said eccentric, in combination with a three-armed lever having one arm moving with said piston, and links connecting the remaining arms respectively to said reciprocating connections and to said valve-stem.

23. In a valve motion, a valve and valve reciprocating devices, and means for imposing an increment of motion at the valve in addition to and in the same direction as the reciprocal movement given by said reciprocating devices.

24. In an outside valve motion for steam locomotives, a valve and valve reciprocating devices, and means for imposing an increment of advance at the valve comprising a variable lever disposed on both sides of and symmetrically arranged with respect to the vertical central plane of the valve and said valve reciprocating devices.

Signed by me at New Haven, Connecticut, this 23rd day of July, 1915.

WILLIAM S. CLARKSON.

Witnesses:
WARREN M. CRAWFORD,
FRED. B. BUNNELL.

Copies of this patent may be obtained for five cents each, by addressing the "Commissioner of Patents, Washington, D. C."